C. M. RHODES.
WAVE ENERGY MOTOR.
APPLICATION FILED APR. 6, 1912

1,044,913.

Patented Nov. 19, 1912.

4 SHEETS—SHEET 3.

WITNESSES

INVENTOR
C. M. Rhodes.
BY
ATTORNEYS

C. M. RHODES.
WAVE ENERGY MOTOR.
APPLICATION FILED APR. 6, 1912.

1,044,913.

Patented Nov. 19, 1912.

4 SHEETS—SHEET 4.

WITNESSES
Samuel Payne

INVENTOR
C. M. Rhodes
BY
ATTORNEYS

UNITED STATES PATENT OFFICE.

CHARLES M. RHODES, OF STEUBENVILLE, OHIO.

WAVE-ENERGY MOTOR.

1,044,913.
Specification of Letters Patent.
Patented Nov. 19, 1912.

Application filed April 6, 1912. Serial No. 688,959.

*To all whom it may concern:*

Be it known that I, CHARLES M. RHODES, a citizen of the United States of America, residing at Steubenville, in the county of Jefferson and State of Ohio, have invented certain new and useful Improvements in Wave-Energy Motors, of which the following is a specification, reference being had therein to the accompanying drawing.

This invention is an improvement upon my pending application for patent on wave energy motors filed May 5th, 1911, Serial No. 625,141.

Besides having the same objects in view as disclosed in my pending application, the present invention aims to provide a wave energy motor embodying simple and effective means for imparting a continuous rotary movement to a shaft from the undulatory movement of a float upon the surface of waves.

My invention further aims to provide a wave power energy motor capable of withstanding the forces of nature to which a motor of this type is subjected, to provide a motor of the above type by which a maximum degree of power can be obtained from a minimum degree of action, and to accomplish the above results by a mechanical construction that is not only highly efficient for the purposes for which it is intended, but of such construction as to warrant its use as a substitute for steam in furnishing power in towns and cities in the vicinity of the ocean.

My invention further aims to accomplish the above results by a combination of mechanical elements that will be hereinafter specifically described and then claimed, and reference will now be had to the drawings, wherein there is illustrated the principles of my invention, in which:—

Figure 1:
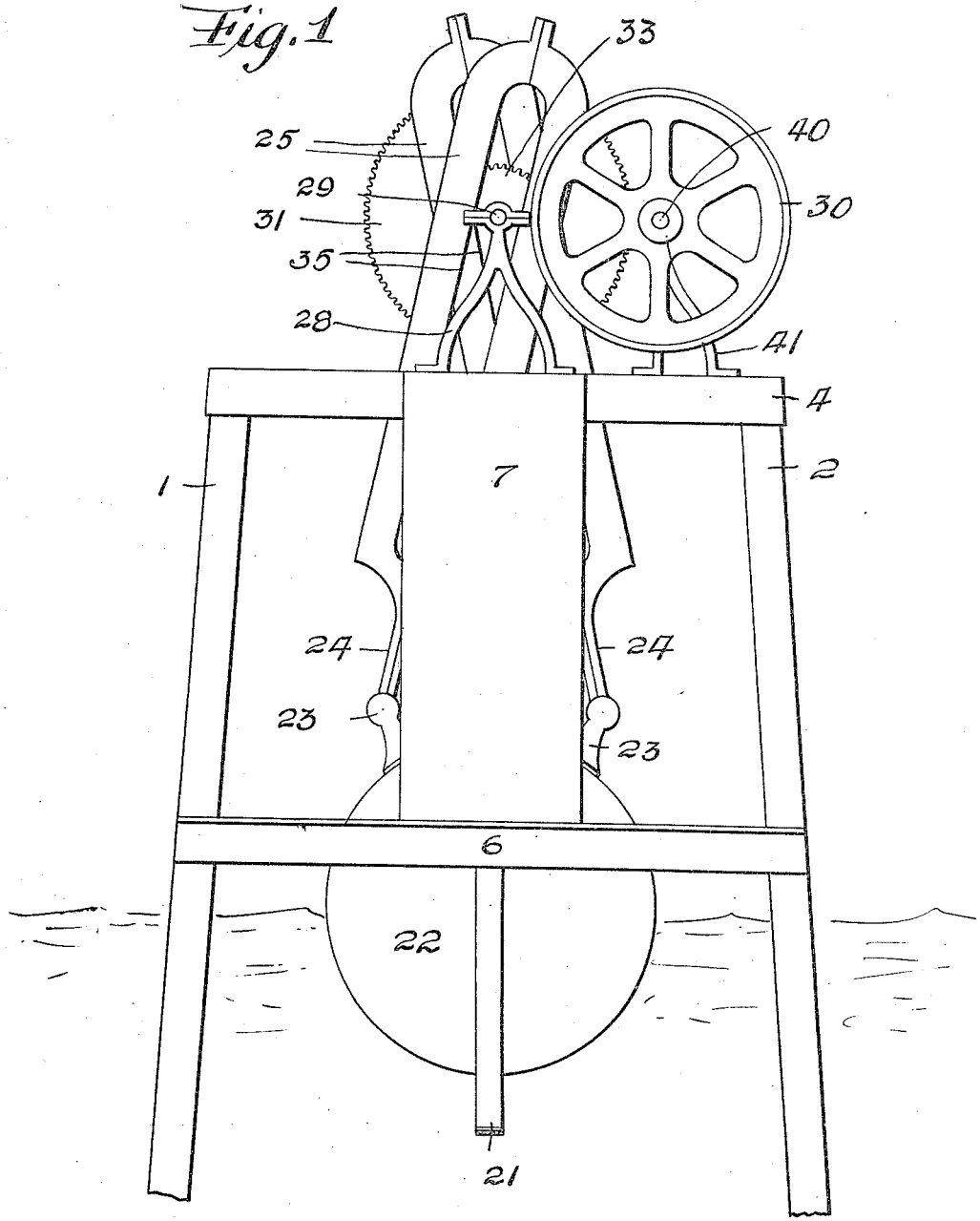
Figure 2:
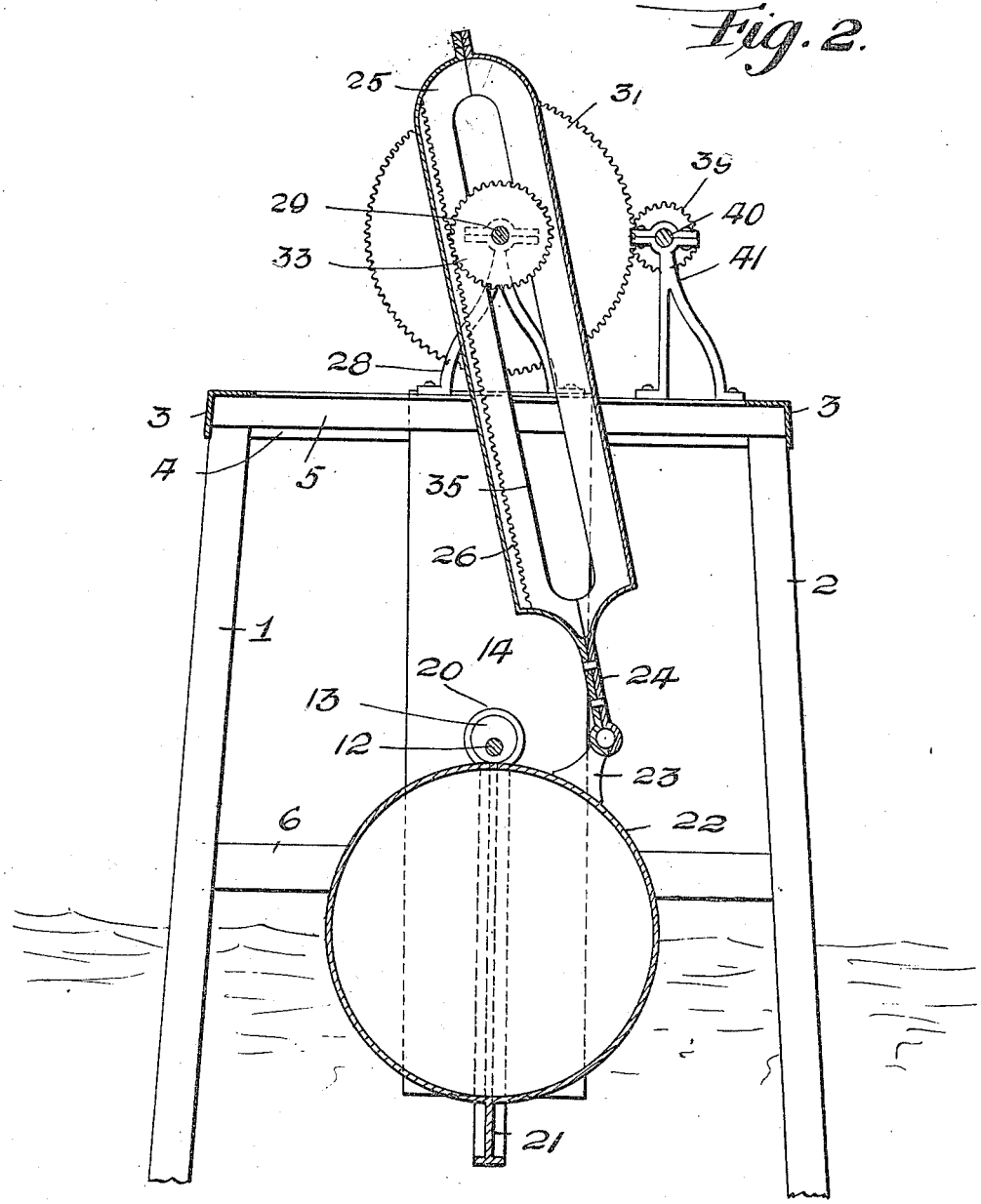
Figure 3:
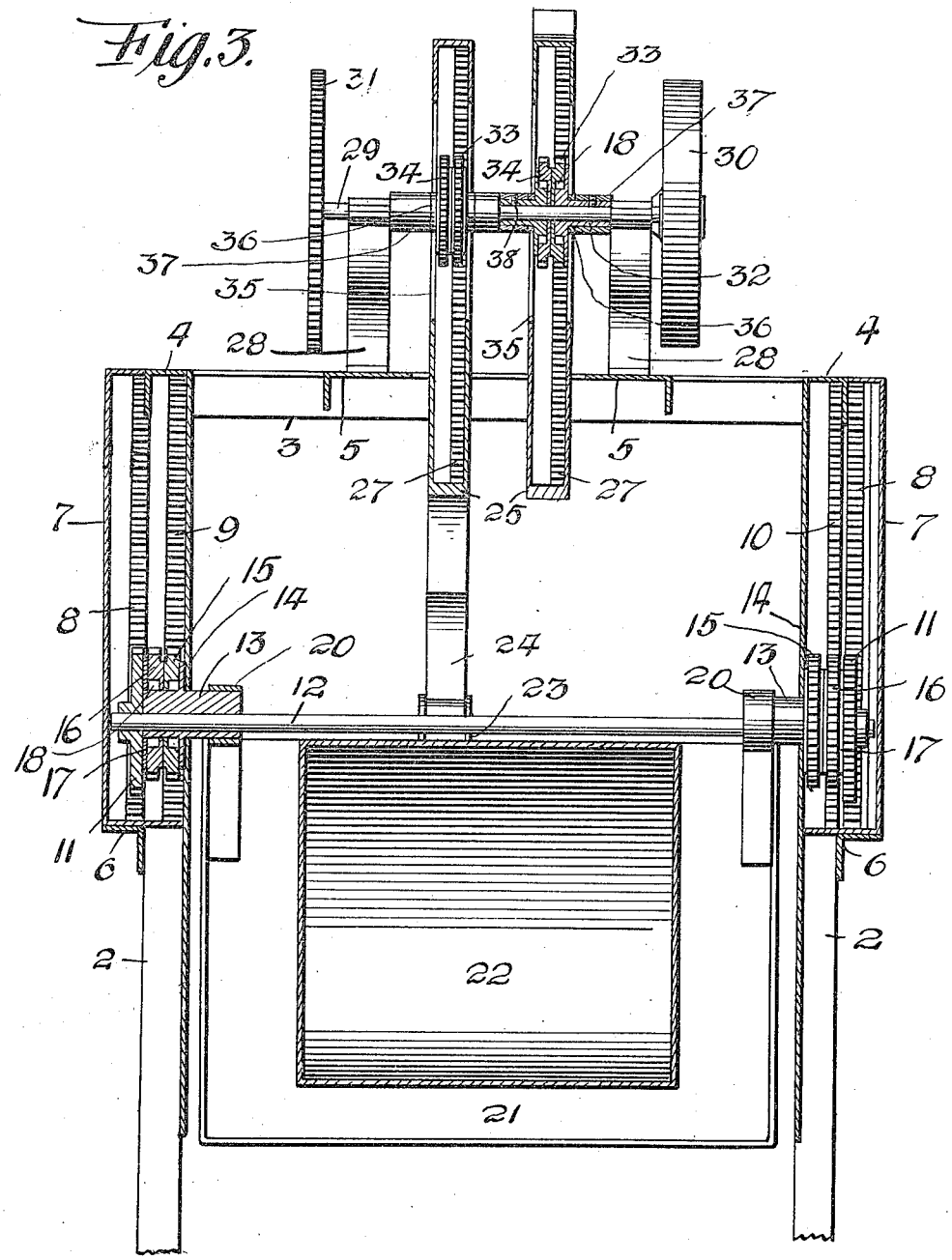
Figures 4, 5:
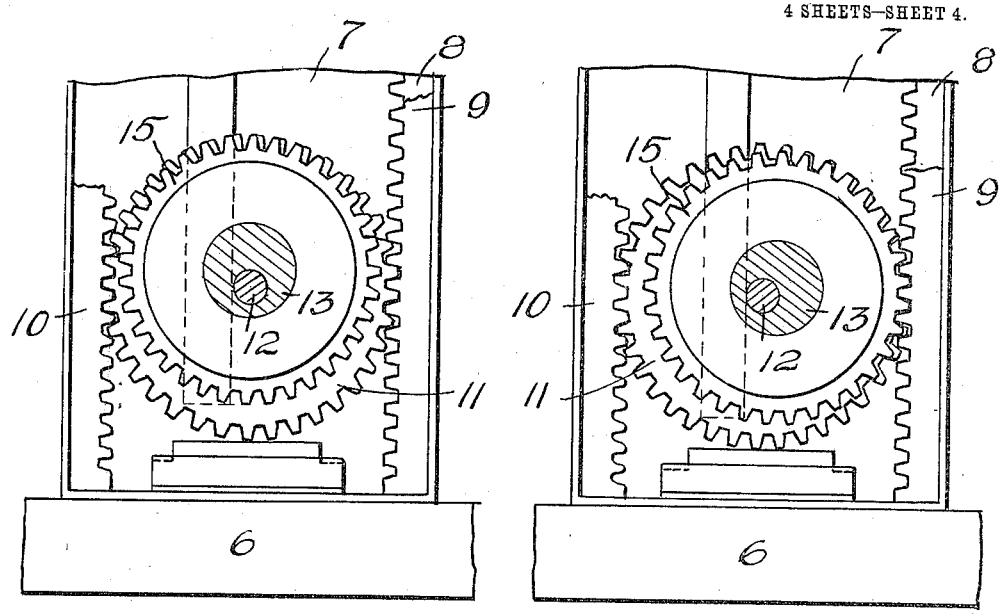
Figure 6:
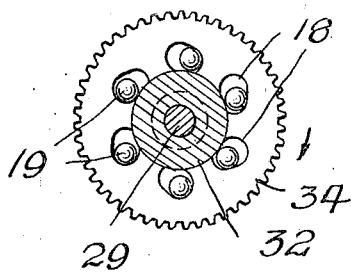
Figure 7:
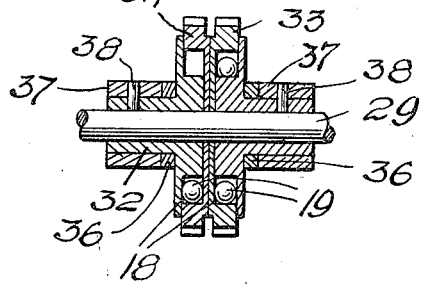

Figure 1 is a side elevation of a motor in accordance with this invention, Fig. 2 is a vertical longitudinal sectional view of the same, Fig. 3 is a cross sectional view of the motor, Figs. 4 and 5 are enlarged elevations of pinions and racks forming part of the motor, Fig. 6 is an enlarged side elevation of one of the pinions of the motor, and Fig. 7 is a longitudinal sectional view of the same.

Further describing my invention with reference to the drawings, like numerals denote corresponding parts throughout: 1 and 2 denoting uprights that are suitably anchored in the ocean and within easy reach from the shore, whereby power from the motor can be easily transferred to shore.

3 denotes angle bars connecting the uprights of each set, at the upper ends thereof, and the angle bars are connected by transverse angle bars 4 and transverse supports 5.

6 denotes transverse angle bars connecting the uprights of one set to the uprights of the other set, and mounted upon these angle bars are vertical oppositely disposed casings 7 that have the upper ends thereof connected to the angle bars 4. In each casing are oppositely disposed vertical guide racks 8 and diagonally disposed power racks 9 and 10. Meshing with the racks 8 are pinions 11 loosely mounted upon a float shaft 12, said shaft extending from one casing to the other and the pinions 11 are employed to insure a uniform movement of the shaft relatively to said casings.

13 denotes hubs mounted upon the ends of the shaft 12 and extending into the casings 7. The hubs 13, intermediate the ends thereof, have peripheral flanges 14 and arranged upon said hub and adapted to rotate therewith in certain directions are power pinions 15 and 16, the pinions 15 meshing with the racks 9 and the pinions 16 meshing with the racks 10. The pinions are retained upon the hub 13 by end washers 17. The pinions 15 and 16 are provided with circumferentially arranged recesses 18 containing drive bodies 19, preferably in the form of balls. Each recess has a large end and a small end, as best shown in Fig. 6, and these recesses are in communication with the periphery of the hub 13, whereby when the drive bodies 19 are in the small ends of the recesses, said bodies will contact with the hub 13. When the hub 13 revolves in the direction of the arrow in Fig. 6, the drive bodies are held in the small ends of the recesses and cause the pinions to revolve in the same direction as the hub 13. The pinions 15 and 16 are arranged whereby the pinions 15 will revolve with the hub in one direction and the pinions 16 with the hub in the opposite direction. While one set of pinions is active, the other set is idle. The hubs 13 are eccentrically mounted upon the ends of the shaft 12, as best shown in Fig. 2 of the drawings and in consequence of this arrangement, the sets of pinions 15 and 16 may be out of mesh with the racks 9 and 10 or one set of pinions in mesh with said racks or the other set, according to the position of the hub 13. This is best shown in Figs. 4 and 5 and the purpose of such arrangement will more readily appear in the general operation of the motor.

20 denotes straps mounted upon the confronting ends of the hubs 13 and supporting a blade 21. The blade 21 has an integral hollow cylindrical float 22 and the top of said float, at opposite sides of the shaft 12, is provided with bearings 23. Pivotally connected to the bearings 23 are the reduced ends 24 of rack casings 25, each casing containing two racks 26 and 27. 28 denotes bearings mounted upon the supports 5 and journaled in said bearings is a power shaft 29 having a balance wheel 30 and a gear wheel 31. Mounted upon the shaft 29, between the bearings 28, are sets of concentric hubs 32 provided with concentric pinions 33 and 34, said pinions being constructed upon the same principle as the pinions 15 and 16, that is, with the drive bodies for engaging said hubs. The rack casings 25 inclose the pinions 33 and 34, and said pinions mesh with the racks 27 and 26 respectively. The rack casings are slotted, as at 35 to provide clearance for the shaft 29 and the hubs thereof, and revolubly mounted upon the hubs are anti-frictional rollers 36 engaging the walls of the slots 35. The rollers 36 are retained upon the hubs by sleeves 37 secured to said hubs, as at 38.

39 denotes a small gear wheel meshing with the gear wheel 31 and the small gear wheels mounted upon the shaft 40, journaled in bearings 41, carried by the supports 5. It is from the shaft 40 that power is derived for operating a motor or other machinery.

Loosely mounted upon the hubs 13 are closure plates 42 that normally close the rack casings 7.

Operation: An undulatory movement or the lateral impulse of a wave causes the blade 21 and the float 22 to swing, rise and lower in the pier structure formed by the elements 1 to 6 inclusive. As the float 22 is swung, the rack casings 25 are moved to impart a rotary movement to the shaft 29 through the medium of the pinions 33 and 34 and the racks 26 and 27.

When the float 22 is elevated as well as moved by the lateral impulse of a wave, a set of pinions 15 or 16, due to the action of the eccentric hubs 13 is swung into mesh with a set of racks 9 or 10 and owing to the engagement of a set of pinions with a set of racks the float is elevated, the shaft 12 will be rotated and in so doing coöperating with the rack casings 25 in further imparting a rotary movement to the power shaft 29. An even movement of the shaft 12 is insured by the pinions 11, consequently the float 22 can easily ride the swell of a wave and contribute to the production of power from the movement of a wave.

When the shaft 12 is lowered or elevated relatively to the rack casings 7, the closure plates 42 close said casings without interfering with the movement of the shaft, thereby preventing seaweed, debris or other matter from entering the casings and interfering with the operation of the mechanism therein.

It is believed that the manner in which the racks and the pinions coöperate with the float in producing a rotary movement from the undulatory movement of a wave will be apparent without further description, and while in the drawings there is illustrated a preferred embodiment of the invention, it is to be understood that the structural elements thereof are susceptible to such variations and modifications as fall within the scope of the appended claims.

What I claim is:—

1. In a wave energy motor, a pier structure, oppositely disposed rack casings carried thereby, a float shaft having the ends thereof movably supported within said rack casings, a float movable with said shaft and adapted to be moved by the undulatory movement of a wave, a power shaft revolubly supported by said pier structure, pinions movable with said shaft in different directions, and rack casings inclosing said pinions and having the lower ends thereof connected to said float at opposite sides of said float shaft for imparting a rotary movement to said power shaft from a movement of said float.

2. In a wave energy motor, a pier structure, oppositely disposed rack casings carried thereby, a float shaft having the ends thereof movably arranged within said casings, pinions at the ends of said float shaft and meshing with the racks within said casings, a float suspended from said float shaft and movable therewith, a power shaft revolubly supported by said pier structure, sets of pinions carried thereby and adapted to revolve with said shaft in different directions, and rack casings inclosing said pinions and having the lower ends thereof pivotally connected to said float to impart a movement to said pinions when said float is moved by the undulatory movement of a wave.

3. In a wave energy motor, a pier structure, oppositely disposed rack casings carried thereby, a float shaft having the ends thereof movably arranged within said casings, pinions at the ends of said float shaft and meshing with the racks within said casings, a float suspended from said float shaft and movable therewith, a power shaft revolubly supported by said pier structure, sets of pinions carried thereby and adapted to revolve with said shaft in different directions, rack casings inclosing said pinions and having the lower ends thereof pivotally connected to said float to impart a movement to said pinions when said float is moved by the undulatory movement of a wave, and closure plates movable with the ends of said float shaft for normally closing the first mentioned rack casings.

4. In a wave energy motor, a pier structure, oppositely disposed rack casings carried thereby, sets of racks arranged within said casings, a float shaft having the ends thereof extending into said casings, pinions carried by the ends of said shaft and meshing with some of said racks, pinions eccentrically supported by the ends of said shaft and adapted to alternately mesh with the other racks of said casings, a float suspended from said shaft and movable therewith, a power shaft revolubly supported by said pier structure, and means including rack casings actuated by said float for imparting a rotary movement to said power shaft.

5. In a wave energy motor, a pier structure, oppositely disposed casings carried thereby, a float shaft having the ends thereof guided within said casings, a float suspended from said shaft and movable therewith, a power shaft revolubly mounted upon said pier structure, sets of pinions carried thereby and movable with said shaft in different directions, drive bodies movably arranged within said pinions and adapted to cause said shaft to move with said pinions in different directions, and rack casings inclosing said pinions and having the lower ends thereof connected to said float and adapted to impart a movement to said pinions from an undulatory movement of said float.

In testimony whereof I affix my signature in the presence of two witnesses.

CHARLES M. RHODES.

Witnesses:
 MAX H. SROLOVITZ,
 CHRISTINA T. HOOD.